United States Patent
Andarawis et al.

(10) Patent No.: US 7,151,329 B2
(45) Date of Patent: *Dec. 19, 2006

(54) INTEGRATED PROTECTION, MONITORING, AND CONTROL SYSTEM

(75) Inventors: Emad Andarawis Andarawis, Ballston Lake, NY (US); Daniel White Sexton, Niskayuna, NY (US); Scott Charles Evans, Burnt Hills, NY (US); Marc Robert Pearlman, Clifton Park, NY (US); Austars Raymond Schnore, Jr., Scotia, NY (US); Charles Scott Sealing, Clifton Park, NY (US); William James Premerlani, Scotia, NY (US); Ertugrul Berkcan, Clifton Park, NY (US); Wendai Wang, Clifton Park, NY (US); Terry Michael Topka, Scotia, NY (US); Mingxiao Jiang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 426 days.

This patent is subject to a terminal disclaimer.

(21) Appl. No.: 10/373,572

(22) Filed: Feb. 25, 2003

(65) Prior Publication Data
US 2003/0205938 A1   Nov. 6, 2003

Related U.S. Application Data

(60) Provisional application No. 60/359,544, filed on Feb. 25, 2002, provisional application No. 60/438,159, filed on Jan. 6, 2003.

(51) Int. Cl.
*H02J 1/10* (2006.01)
(52) U.S. Cl. ........................................ 307/52

(58) Field of Classification Search .................. 361/64, 361/65, 66; 700/292; 307/52
See application file for complete search history.

(56) References Cited

U.S. PATENT DOCUMENTS 3,772,505 A    11/1973   Massell (Continued)

FOREIGN PATENT DOCUMENTS

EP           0718948 A2      6/1996

(Continued)

OTHER PUBLICATIONS

Atanackovic D. et al. An Integrated Knowledge-Based Model For Power-System Planning IEEE Expert, IEEE Inc. New York, Jul. 1997; pp. 65-71.

*Primary Examiner*—Robert L. Deberadinis
(74) *Attorney, Agent, or Firm*—Ohlandt, Greeley, Ruggiero & Perle, L.L.P.

(57) ABSTRACT

A method and system for monitoring and controlling a power distribution system is provided. The system includes a plurality of circuit breakers and a plurality of node electronic units. Each node electronic unit is mounted remotely from an associated circuit breaker that is electrically coupled with one of the node electronic units. The system also includes a first digital network, and a first central control unit. The first central control unit and the plurality of node electronic units are communicatively coupled to the first digital network. The method includes receiving digital signals from each node electronic unit at the central control unit, determining an operational state of the power distribution system from the digital signal, and transmitting digital signals to the plurality of node electronic units such that the circuit breakers are operable from the first central control unit.

26 Claims, 8 Drawing Sheets

U.S. PATENT DOCUMENTS

| | | |
|---|---|---|
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,234,901 A * | 11/1980 | Strickland, Jr. .............. 361/64 |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,935,837 A * | 6/1990 | Sun ............................ 361/64 |
| 4,964,058 A | 10/1990 | Brown, Jr. |
| 4,972,290 A * | 11/1990 | Sun et al. ..................... 361/64 |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |

| | | | | | | |
|---|---|---|---|---|---|---|
| 6,005,757 | A | 12/1999 | Shvach et al. | 6,406,328 | B1 | 6/2002 | Attarian et al.
| 6,005,758 | A | 12/1999 | Spencer et al. | 6,411,865 | B1 | 6/2002 | Qin et al.
| 6,018,451 | A | 1/2000 | Lyke et al. | 6,441,931 | B1 | 8/2002 | Moskovich et al.
| 6,038,516 | A | 3/2000 | Alexander et al. | 6,459,997 | B1 | 10/2002 | Andersen
| 6,047,321 | A | 4/2000 | Raab et al. | 6,496,342 | B1 * | 12/2002 | Horvath et al. ............... 361/65
| 6,054,661 | A | 4/2000 | Castonguay et al. | 6,535,797 | B1 | 3/2003 | Bowles et al.
| 6,055,145 | A | 4/2000 | Lagree et al. | 6,549,880 | B1 | 4/2003 | Willoughby et al.
| 6,061,609 | A | 5/2000 | Kanoi et al. | 6,553,418 | B1 | 4/2003 | Collins et al.
| 6,084,758 | A | 7/2000 | Clarey et al. | 2001/0010032 | A1 | 7/2001 | Ehlers et al.
| 6,138,241 | A | 10/2000 | Eckel et al. | 2001/0032025 | A1 | 10/2001 | Lenz et al.
| 6,139,327 | A | 10/2000 | Callahan et al. | 2001/0044588 | A1 | 11/2001 | Mault
| 6,141,196 | A | 10/2000 | Premerlani et al. | 2001/0048354 | A1 | 12/2001 | Douville et al.
| 6,157,527 | A | 12/2000 | Spencer et al. | 2001/0055965 | A1 | 12/2001 | Delp et al.
| 6,167,329 | A | 12/2000 | Engel et al. | 2002/0010518 | A1 | 1/2002 | Reid et al.
| 6,175,780 | B1 | 1/2001 | Engel | 2002/0032535 | A1 | 3/2002 | Alexander et al.
| 6,185,482 | B1 | 2/2001 | Egolf et al. | 2002/0034086 | A1 | 3/2002 | Scoggins et al.
| 6,185,508 | B1 | 2/2001 | Van Doorn et al. | 2002/0045992 | A1 | 4/2002 | Shincovich et al.
| 6,186,842 | B1 | 2/2001 | Hirschbold et al. | 2002/0059401 | A1 | 5/2002 | Austin
| 6,195,243 | B1 | 2/2001 | Spencer et al. | 2002/0063635 | A1 | 5/2002 | Shincovich
| 6,198,402 | B1 | 3/2001 | Hasegawa et al. | 2002/0064010 | A1 | 5/2002 | Nelson et al.
| 6,212,049 | B1 | 4/2001 | Spencer et al. | 2002/0091949 | A1 | 7/2002 | Ykema
| 6,233,128 | B1 | 5/2001 | Spencer et al. | 2002/0094799 | A1 | 7/2002 | Elliott et al.
| 6,236,949 | B1 | 5/2001 | Hart | 2002/0107615 | A1 | 8/2002 | Bjorklund
| 6,242,703 | B1 | 6/2001 | Castonguay et al. | 2002/0108065 | A1 | 8/2002 | Mares
| 6,268,991 | B1 | 7/2001 | Criniti et al. | 2002/0109722 | A1 | 8/2002 | Rogers et al.
| 6,285,917 | B1 | 9/2001 | Sekiguchi et al. | 2002/0111980 | A1 | 8/2002 | Miller et al.
| 6,288,882 | B1 | 9/2001 | Criniti et al. | 2002/0116092 | A1 | 8/2002 | Hamamatsu et al.
| 6,289,267 | B1 | 9/2001 | Alexander et al. | 2002/0124011 | A1 | 9/2002 | Baxter et al.
| 6,291,911 | B1 | 9/2001 | Dunk et al. | 2002/0146076 | A1 | 10/2002 | Lee
| 6,292,340 | B1 | 9/2001 | O'Regan et al. | 2002/0146083 | A1 | 10/2002 | Lee et al.
| 6,292,717 | B1 | 9/2001 | Alexander et al. | 2002/0147503 | A1 | 10/2002 | Osburn, III
| 6,292,901 | B1 | 9/2001 | Lys et al. | 2002/0159402 | A1 | 10/2002 | Binder
| 6,297,939 | B1 | 10/2001 | Bilac et al. | 2002/0162014 | A1 | 10/2002 | Przydatek et al.
| 6,313,975 | B1 | 11/2001 | Dunne et al. | 2002/0163918 | A1 | 11/2002 | Cline
| 6,341,054 | B1 | 1/2002 | Walder et al. | 2002/0165677 | A1 | 11/2002 | Lightbody et al.
| 6,347,027 | B1 | 2/2002 | Nelson et al. | 2002/0181174 | A1 | 12/2002 | Bilac et al.
| 6,351,823 | B1 | 2/2002 | Mayer et al. | 2002/0193888 | A1 | 12/2002 | Wewalaarachchi et al.
| 6,356,422 | B1 * | 3/2002 | Bilac et al. ................ 361/93.1 | 2003/0043785 | A1 | 3/2003 | Liu et al.
| 6,356,849 | B1 | 3/2002 | Jaffe | | | |
| 6,369,996 | B1 | 4/2002 | Bo | | | |
| 6,377,051 | B1 | 4/2002 | Tyner et al. | | | |
| 6,385,022 | B1 | 5/2002 | Kulidjian et al. | | | |
| 6,396,279 | B1 | 5/2002 | Gruenert | | | |
| 6,397,155 | B1 | 5/2002 | Przydatek et al. | | | |
| 6,405,104 | B1 | 6/2002 | Dougherty | | | |

FOREIGN PATENT DOCUMENTS

EP 0723325 A1 7/1996
EP 0949734 A2 10/1999
WO WO 01/37392 A1 * 5/2001

* cited by examiner

INTEGRATED PROTECTION, MONITORING, AND CONTROL SYSTEM

CROSS REFERENCE TO RELATED APPLICATIONS

This application is related to U.S. patent application Ser. No. 60/359,544 filed on Feb. 25, 2002 for "Integrated Protection, Monitoring, and Control" the content of which is incorporated in its entirety herein by reference. This application is also related to U.S. patent application Ser. No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for protecting, monitoring, and controlling the electrical switchgear.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

BRIEF DESCRIPTION OF THE INVENTION

In one aspect, a method for monitoring and controlling a power distribution system is provided. The system includes a plurality of circuit breakers, a plurality of node electronic units, each node electronic unit mounted remotely from an associated circuit breaker, each associated circuit breaker electrically coupled with each respective node electronic unit, a first digital network, and a first central control unit including a first power system global information set wherein the first central control unit and the plurality of node electronic units are communicatively coupled to the first digital network through a communication network interface. The method includes receiving at least one digital signal from each node electronic unit at a central control unit, determining an operational state of the power distribution system from the digital signal, and transmitting at least one digital signal to the plurality of node electronic units such that the circuit breakers are operable from the first central control unit.

In another aspect, a power distribution system is provided. The system includes a plurality of circuit breakers, a plurality of node electronic units wherein each node electronic unit is mounted remotely from the plurality of circuit breakers, and wherein each respective circuit breaker is electrically coupled with each respective node electronic unit. Each respective node electronic unit is configured to receive signals from it's respective circuit breaker; and to transmit signals to the respective circuit breaker. The system also includes a digital network, and a first central control unit wherein the first central control unit and the plurality of node electronic units are communicatively coupled to the digital network, and the first central control unit is configured to receive digital signals from the plurality of node electronic units, determine an operational state of the power distribution system from the digital signals, and transmit digital signals to the plurality of node electronic units such that the circuit breakers are operable from the first central control unit.

DETAILED DESCRIPTION OF THE INVENTION

Figure 1:
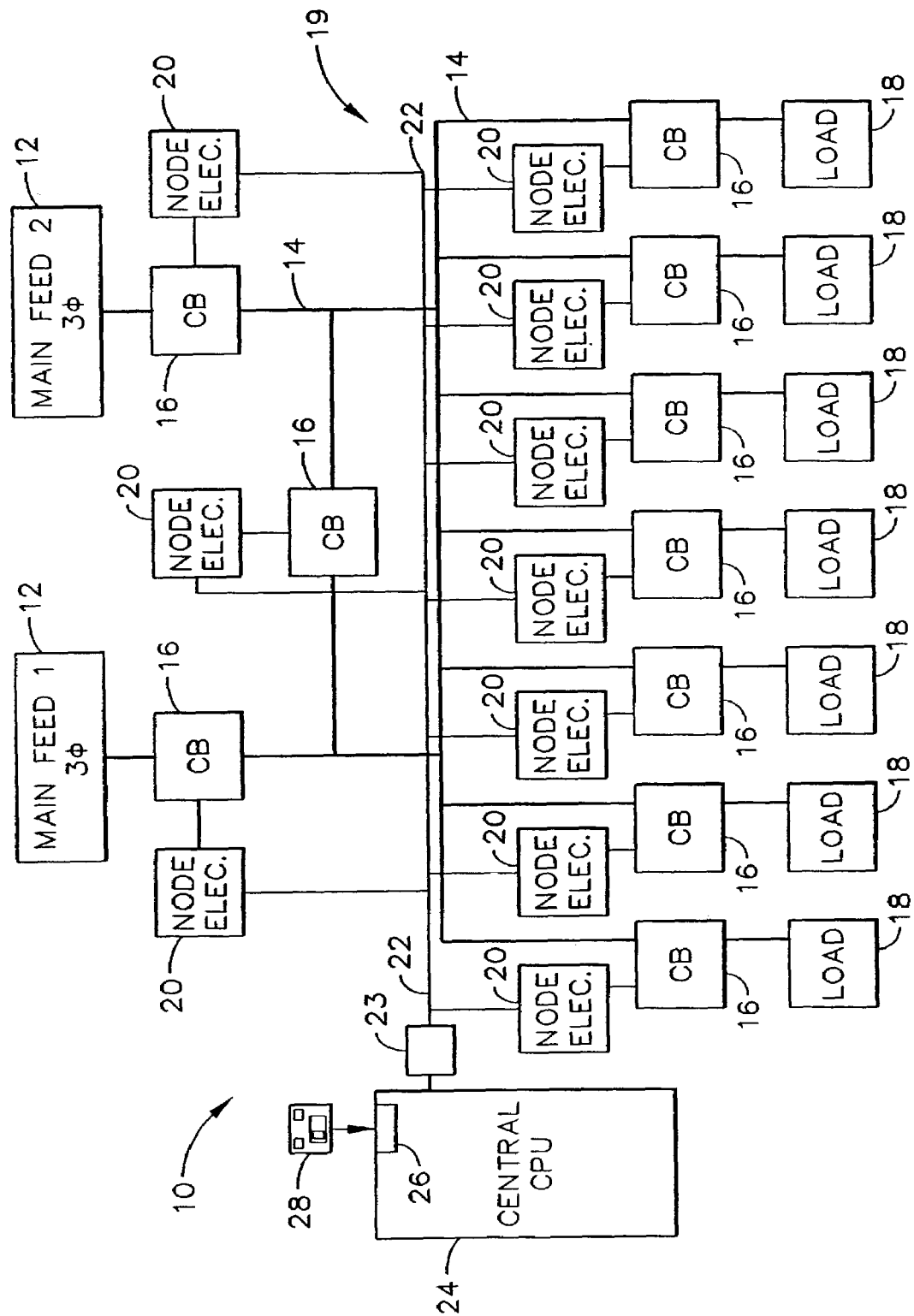
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
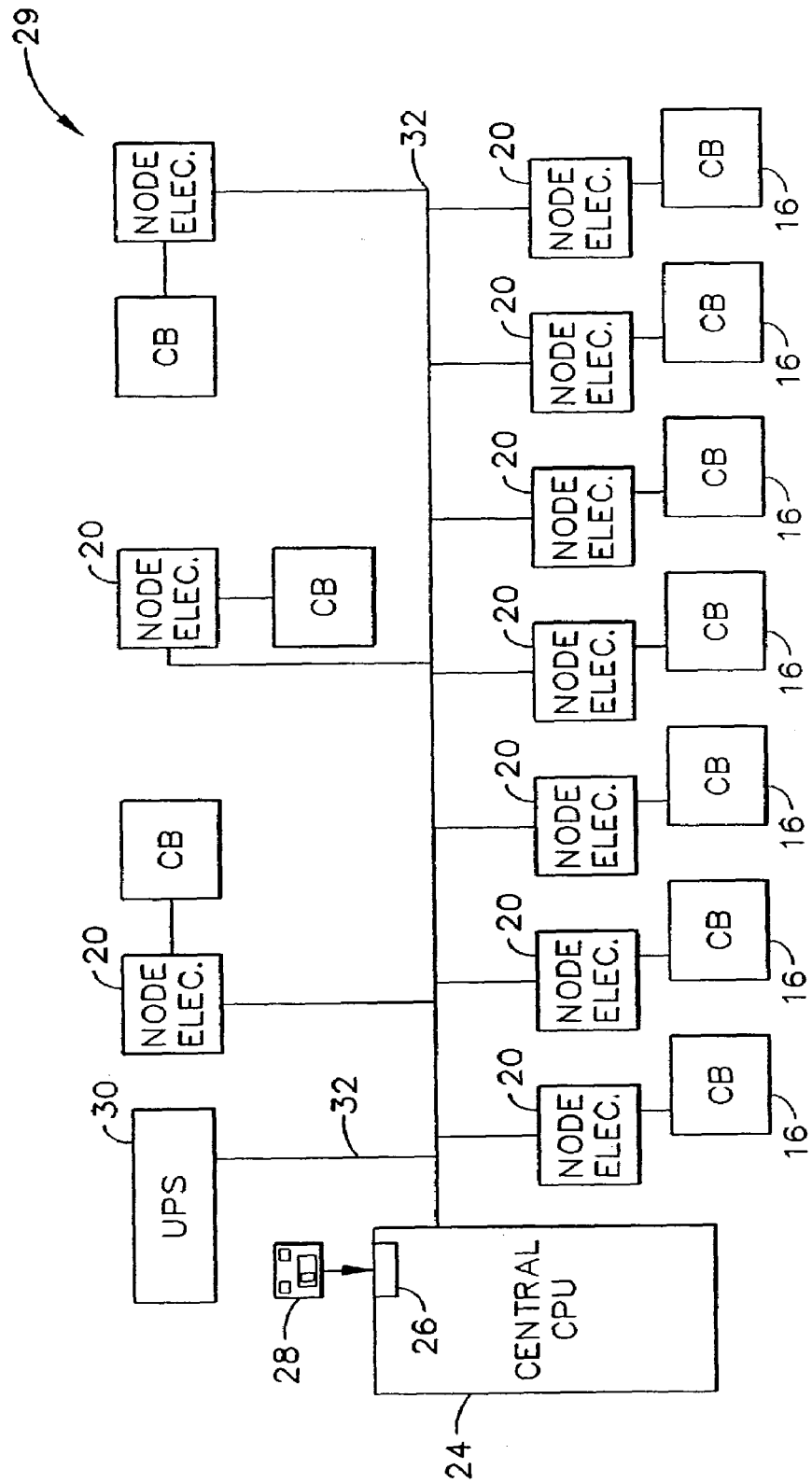
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
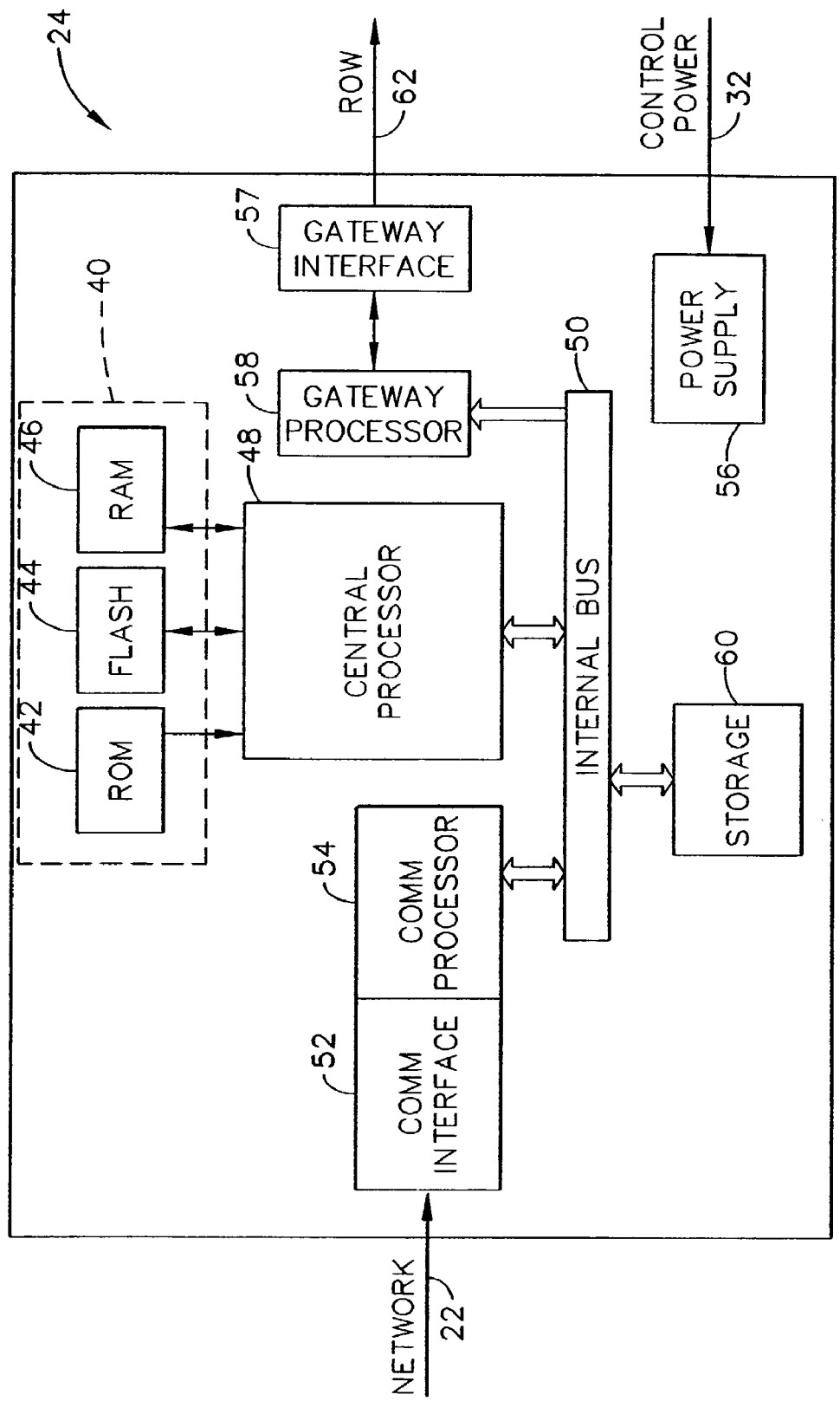
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bidirectional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronics unit 20 via CCPU 24 and digital network 22. In another embodiment, information sent from node electronics unit 20 is received at communication interface 52 and transmitted to Internet 62 via gateway interface 57.

Figure 4:
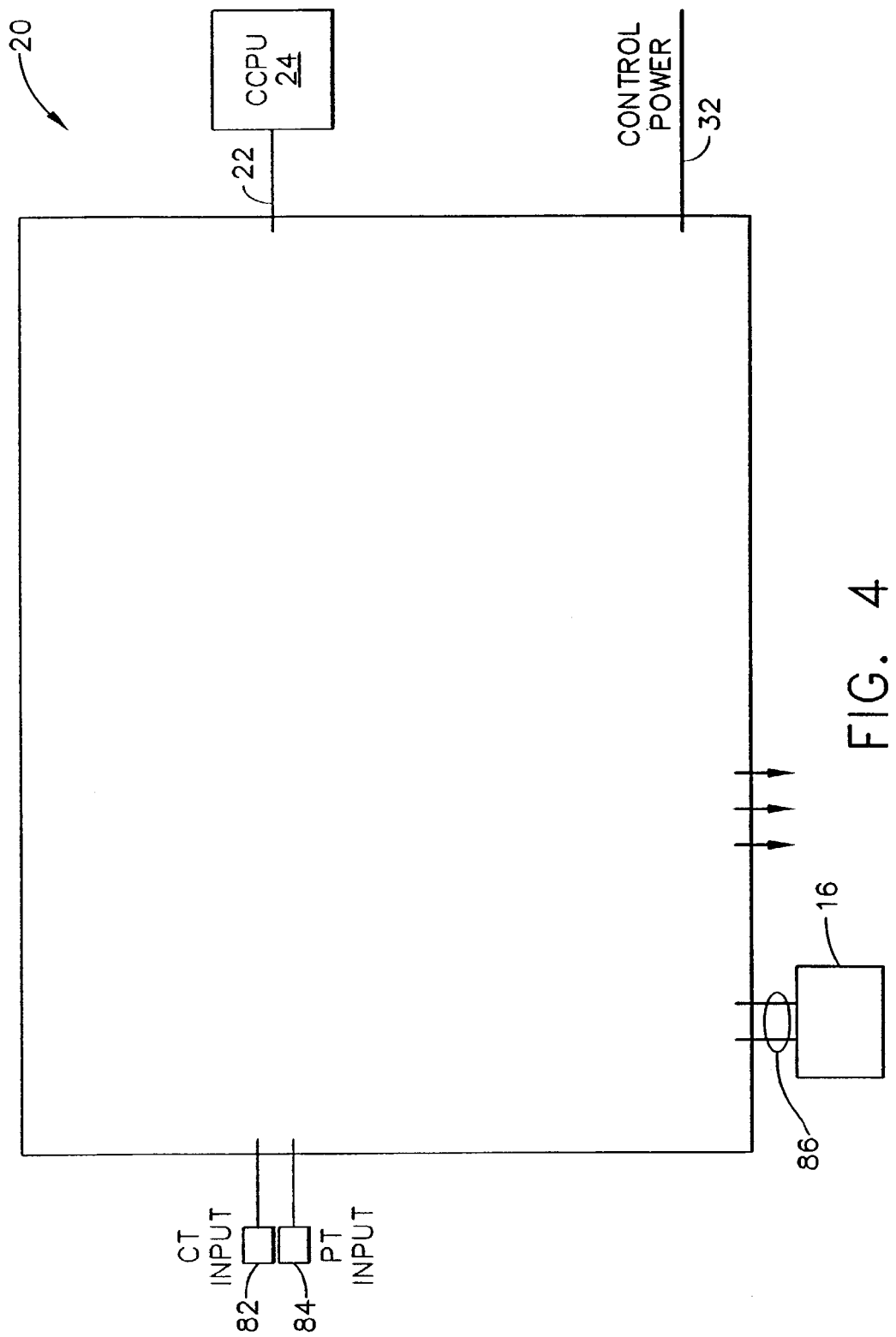
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals 86 input from a plurality of devices, such as, but not limited to, a current sensor 82, a voltage sensor 84, and/or circuit breaker 16. Status signals 86 from circuit breaker 16 can include signals related to one or more conditions of the breaker, such as, but not limited to, an auxiliary switch status, and a spring charge switch status. Additionally, node electronics unit 20 sends signals 86 to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal 86 in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
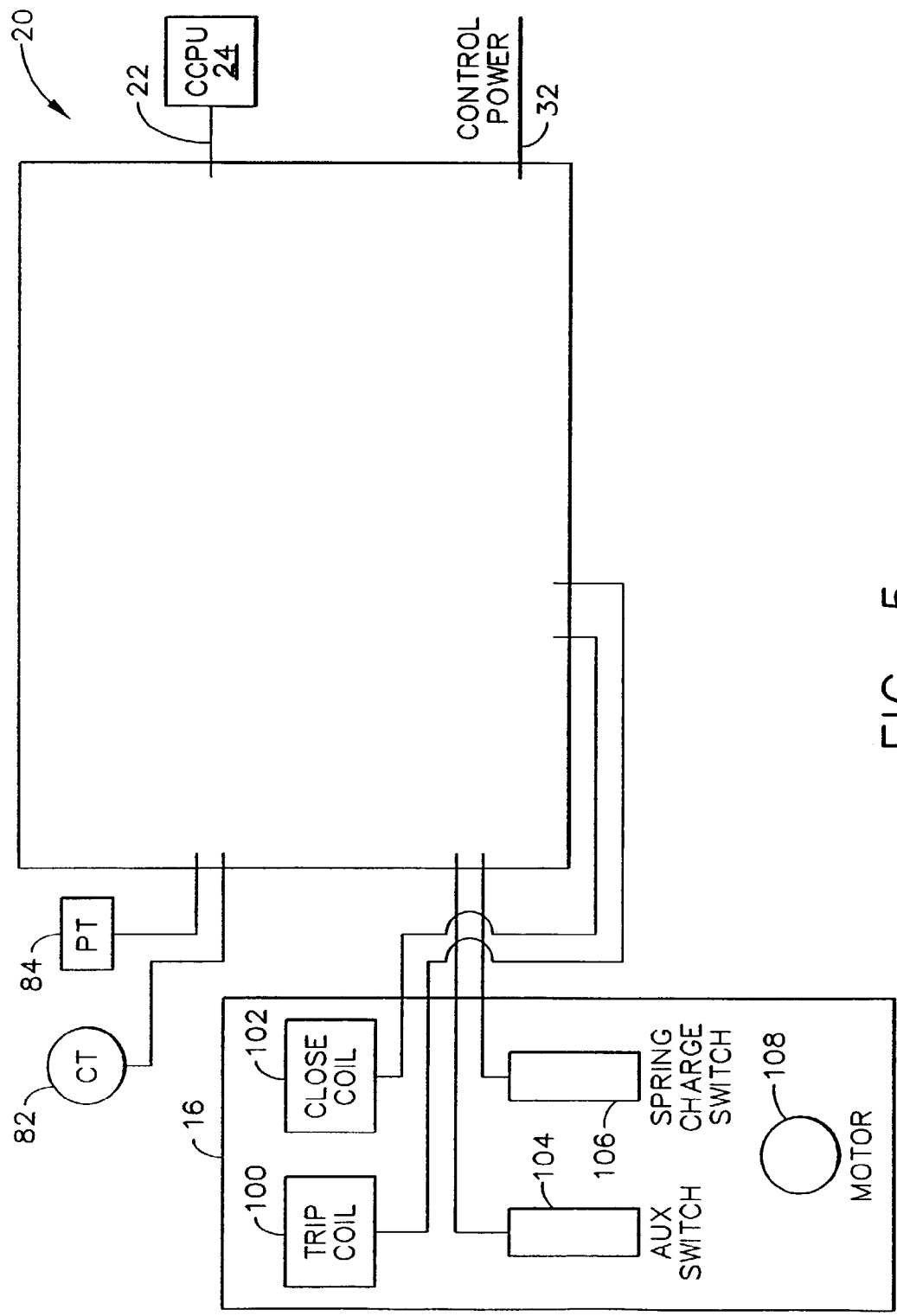
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof. In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electromechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
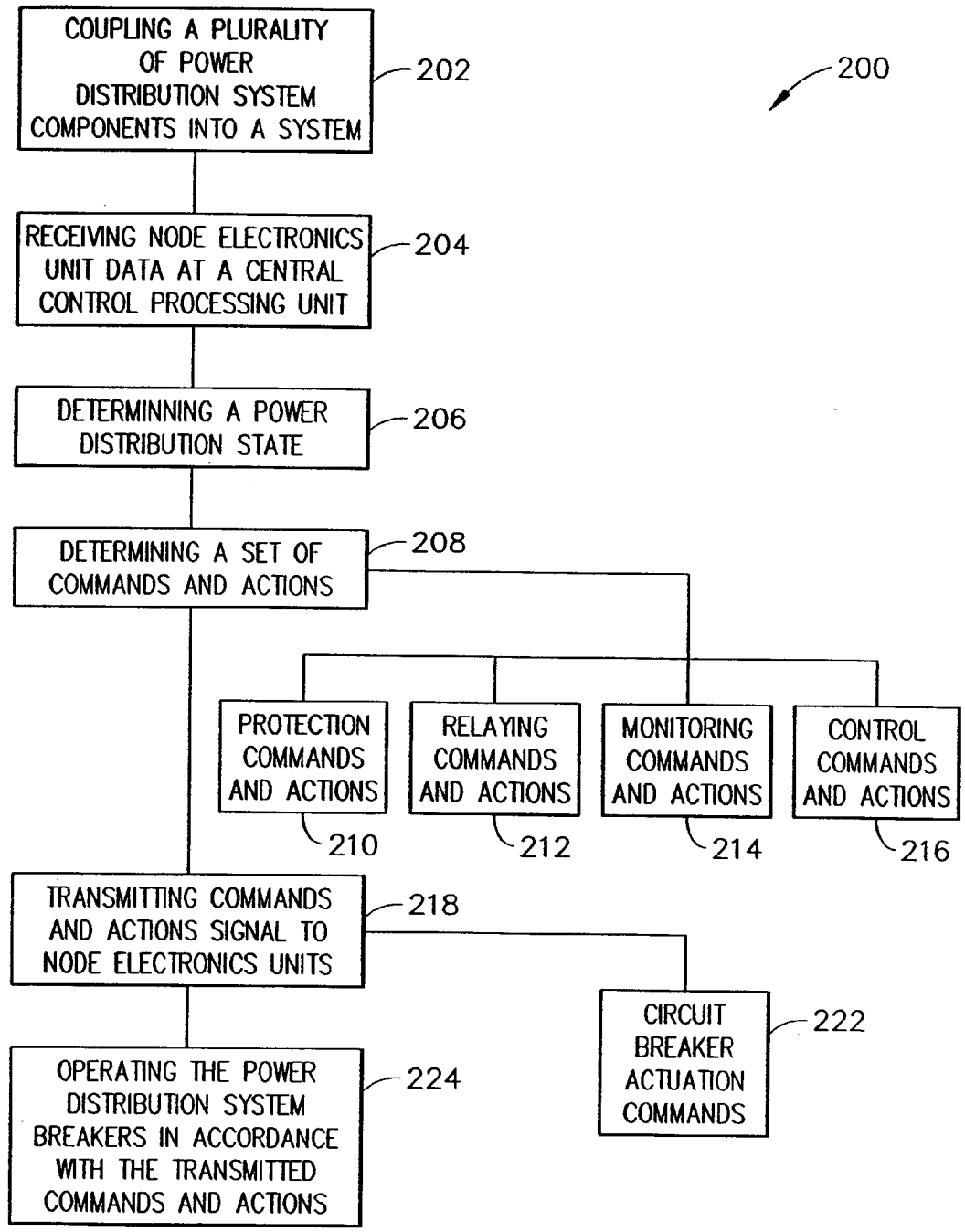
FIG. 6 is a flow chart illustrating an exemplary embodiment of a method 200 for operating power distribution system shown in FIG. 1.

FIG. 6 is a flow chart illustrating an exemplary embodiment of a method 200 for operating power distribution system 10 shown in FIG. 1. Method 200 for monitoring and controlling a power distribution system 10 includes electrically coupling 202 a plurality of circuit breakers 16 to a power distribution bus 14, and electrically coupling a plurality of node electronic units 20 to circuit breakers 16, wherein each node electronic unit 20 is mounted remotely from a circuit breaker 16 associated with node electronics unit 20, and each respective circuit breaker 16 is electrically or communicatively coupled with each respective node electronic unit 20. In the exemplary embodiment, node electronics unit 20 is coupled to its associated circuit breaker 16 through a wiring harness. In an alternative embodiment, node electronics unit 20 is coupled communicatively through, for example, but not limited to, a fiber-optic line, or a wireless link to circuit breaker 16. Each respective node electronic unit 20 is configured to receive signals from the respective circuit breaker 16, and transmit signals to the respective circuit breaker 16. CCPU 24 and the plurality of node electronic units 20 are communicatively coupled to digital network 22. CCPU 24 is configured to receive digital signals from the plurality of node electronic units 20 and transmit digital signals to the plurality of node electronic units 20 such that circuit breakers 16 are operable from CCPU 24. In the exemplary embodiment, circuit breakers 16 and node electronic units 20 are coupled in a one-to-one correspondence, that is, each circuit breaker 16 is coupled and receives signals from only one node electronic unit 20, and each node electronic unit 20 is coupled to only one circuit breaker 16. Likewise, a set of sensors associated with the respective circuit breaker 16 is coupled to the respective node electronics unit 20 associated with that circuit breaker 16. The set of sensors are coupled to node electronics unit 20 in a one-to-one correspondence wherein each sensor communicates an electrical parameter associated with one circuit breaker 16 to only the node electronics unit 20 associated with that circuit breaker 16. In the exemplary embodiment, the sensors and node electronics unit 20 are coupled electrically. In an alternative embodiment, the sensors and node electronics unit 20 may be coupled communicatively through, for example, but not limited to, a fiber-optic line, or a wireless link. Each circuit breaker 16 operation is initiated by its associated node electronic unit 20, and each circuit breaker 16 has only manual trip and closure operability on its own. In one embodiment, manual or local circuit breaker 16 operability may be overridden by a lockout command initiated by CCPU 24. Node electronic unit 20 initiates a circuit breaker actuation command internally or relays a circuit breaker actuation command from CCPU 24 to circuit breaker 16. CCPU 24 transmits circuit breaker actuation commands in a packet of data over network 22 via a broadcast message. Each node electronic unit 20 receives all broadcast messages transmitted over network 22 and parses each data packet to extract data and commands specific to each node electronic unit 20.

Method 200 includes receiving 204 data from at least one node electronics unit 20 by CCPU 24. Node electronics unit 20 receives data from its associated circuit breaker 16 and respective sensors and transmits the raw data received from circuit breaker 16 to CCPU 24 via a unicast message transmitted over network 22. A unicast message is a message sent over network 22 addressed to a specific node, such that any other node receiving a unicast message will not process the message. In the exemplary embodiment, each node electronics unit 20 sends a unicast message to each CCPU 24 that is coupled to network 22 and no node electronics unit 20 will process a unicast message addressed to any CCPU 24. Raw data may include operational values and state information that has not been processed by node electronics unit 20 other than to package the data in digital form compatible with transmission over network 22. CCPU 24 receives 204 data packets from each node electronics unit 20 operating on system 10. The data packets include for example, but, not limited to, circuit breaker load current and voltage values, circuit breaker state information, including breaker open, breaker closed and spring charge state, a node electronics unit state, and additional state and status information included by node electronics unit 20 specific to the operating condition of circuit breaker 16 and node electronics unit 20.

From the data packets received 204 from all node electronics units 20, algorithms running on CCPU 24 determine 206 a power distribution system state. Data from all node electronics units 20 is assimilated to create a global information set of the operation of distribution system 10. Using the global information set, CCPU 24 determines 208 a set of CCPU commands and actions which may satisfy system optimization algorithms running on CCPU 24. In one embodiment, the set of CCPU commands and actions includes protection commands and actions 210, relay commands and actions 212, monitoring commands and actions 214, and control commands and actions 216.

Protection commands and actions 210 include, for example, but, not limited to, instantaneous overcurrent action, a short time overcurrent action, a long time overcurrent action, a ground fault action, and a zone selective interlock action. Instantaneous overcurrent action, a short time overcurrent action, a long time overcurrent action relate to a time versus curve relationship that determines when circuit breaker 16 should be tripped in order to protect a load, the interconnecting cabling, the switchgear bussing and/or circuit breaker 16 during a fault condition on the circuit. Generally, the higher the magnitude of the fault current, the shorter the allowable time delay before action is taken to isolate the fault. A ground fault action provides protection of equipment from line-to-ground fault currents by operating to trip circuit breaker 16 to open all ungrounded conductors of the faulted circuit, and a zone selective interlock action may be used to reduce stress on electrical distribution equipment during fault conditions by reducing the time it takes to clear a fault, while maintaining system coordination between overcurrent protection devices. Zone selective interlock action determines optimal settings for circuit breaker trip values including, for example, instantaneous, short term and long term current trips. Additionally, zone selective interlock action is able to realign loads prior to a circuit breaker trip to avoid a trip rather than reacting to a circuit breaker trip. Zone selective interlock action is a software algorithm, so the zone interlock trip scheme may be revised as conditions in system 10 change without rewiring a hardware interlock controller or reprogramming, as is required in at least some known software interlock controllers.

Relay commands and actions 212 include a voltage action, a frequency action, a ground fault relay action, a bus differential action Monitoring commands and actions 214 includes a circuit breaker current, a circuit breaker voltage, a power system event, a set of power quality parameters, a meter function, and a health/availability indication. The power system event may include a load warning, a trip indication, and a waveform capture. The meter function may include an energy flow, and a demand.

Control commands and actions 216 include, for example, a basic function, and a system function. The basic function includes a manual function, a startup function, and a maintenance function. The system function may include an automatic throwover function, a balanced power supply function, and a load pickup function. Balanced power supply function pro-actively determines an optimal power supply line-up for distribution system 10. By using global load current data from all circuit breakers 16 and sensors through node electronics units 20, CCPU 24 evaluates power supply margins, and operation and determines an optimal lineup of power supply sources to satisfy predetermined criteria.

The determined 208 set of CCPU commands and actions are transmitted 218 over network 22 to all node electronics units 20 from CCPU 24. In one embodiment, the transmitted 218 set of CCPU commands and actions includes a circuit breaker open and close command 222. Each node electronics unit 20 receives information for all node electronics units 20 and removes data specific to it and its associated circuit breaker 16. Each node electronics unit 20 updates its memory to incorporate the information received. Each node electronics unit 20 sends signals to its associated circuit breaker 16 to operate 224 circuit breaker 16 in accordance with the received information.

In use, method 200 facilitates providing an advanced optimized protection system and adaptive control through a centralized control architecture and conditional based operation. In the exemplary embodiment, power distribution system 10 includes a circuit breaker control protection system architecture with a centralized control, i.e. CCPU 24 which facilitates providing various optimized protections that are based on a plurality of global information obtained from electronic node electronic units 20 and breakers 16 positioned at varying locations in system 10. All system information, including breaker status information and voltages and currents associated with each breaker is sent from local node electronic units 20 to a central location in a one-to-one relationship with each breaker 16. In addition a plurality of physically relevant parameters of breakers 16 are read by node electronics units 20 facilitate monitoring a plurality of physical states, such as, but not limited to, a breaker open state, a breaker closed state, and a breaker locked-out state, and a plurality of responses to actuation commands from each circuit breaker 16. Additionally, using a network architecture based on fast communication protocol facilitates ensuring the same approximate latency as in known trip units. For example, since all the raw (unprocessed) data is sent to CCPU 24, CCPU 24 can perform optimal and adaptive control based on all the information available from all electronic node units 20. Accordingly, a decision is made by CCPU 24 based on the global information received from all electronic node units 20, rather then local information that would normally be available at each breaker. In one embodiment, optimal protection procedures, including an optimal coordination of protection among layers of devices, i.e. circuit breakers 16, is performed by CCPU 24 such that only a circuit breaker 16 closest to a fault is tripped by CCPU 24. In addition, a backup protection provided at a layer closest to a fault.

In another exemplary embodiment, CCPU 24 is configured to adjust a trip time delay of each circuit breaker 16 to facilitate responding to a severity of a short detected at CCPU 24. Additionally, an optimal selection of one or more of a variety of power sources or optimum switching from one-source to another is provided. The above examples are described as specific examples of optimization, accordingly, system 10 described herein is not limited to these specific described optimizations.

In use, system 10 facilitates providing a system wide optimal protection based on system wide data and condition monitoring. Additionally, real time operation is achieved with flexible delays, and a set of low cost circuit breakers is accessed through a high-speed network through the use of node or local electronics. System 10 also facilitates reduced wiring requirements since all the node electronic units 24 are connected using a single digital network, and facilitates providing an early failure warning for system 10 prior to a failure by monitoring current and voltage. Further, backup protection, provided at next to the closest layer to a fault, facilitates improved coordination since there is no need for signaling between each individual breaker.

Figure 7:
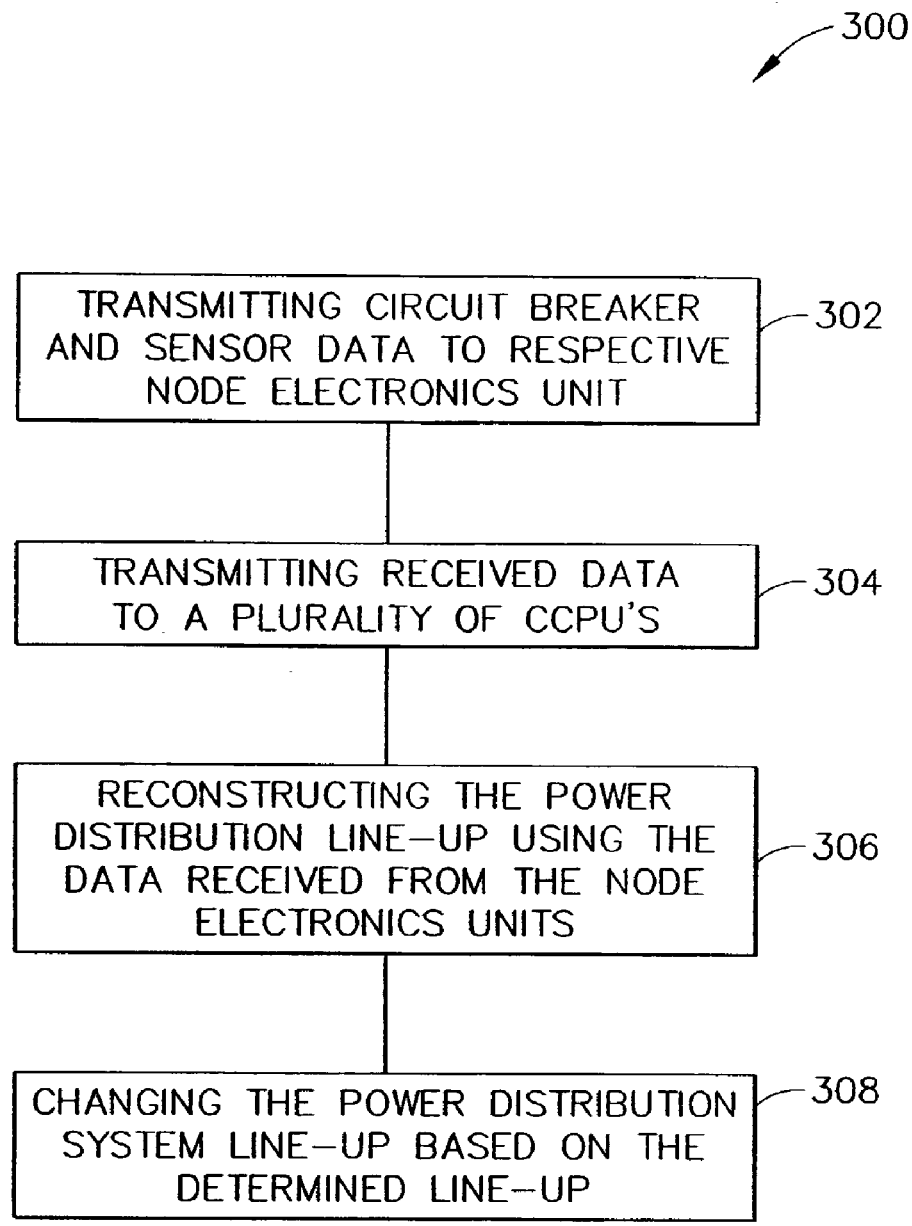
FIG. 7 is a flow chart illustrating an exemplary embodiment of a method 300 for operating power distribution system shown in FIG. 1.

FIG. 7 is a flow chart illustrating an exemplary embodiment of a method 300 for operating power distribution system 10 shown in FIG. 1. Method 300 for monitoring and controlling a power distributions system 10 includes transmitting 302 a plurality of circuit breaker sensor data to a respective node electronic unit, wherein each node electronic unit 20 is mounted remotely from a plurality of circuit breakers 16, and each respective circuit breaker 16 is electrically coupled with each respective node electronic unit 20. Method 300 also includes transmitting 304 the received data from each respective node electronic unit to a plurality of CCPUs 24 using digital network 22, and reconstructing 306 a system 10 lineup using the data received from the plurality of node electronic units 20, and changing 308 system 10 lineup based on the reconstructed 306 system 10 lineup using at least one of the plurality of CCPUs 24.

In one embodiment, each respective node electronic unit 20 stores the state information received from it respective breaker 16, and also transmits 304 this data to a plurality of CCPU's 24. Each CCPU 24 is then capable of reconstructing 306 the state information of system 10 based on the received information. In use, actions taken by at least one CCPU 24 will change the state of system 10. This change is then locally stored by each respective node electronic unit 20, and communicated all CCPU's 24. Accordingly, each CCPU 24 can then infer actions taken by other CCPU's 24 without having to maintain inter-processor communication between them. In the event of a CCPU 24 failure that results in loss of contents of its volatile memory, each CCPU 24 can quickly reconstruct the state of system 10 based on the information that is received from each node electronic unit 20. Additionally, in a "hot backup" system in which only one of the redundant CCPU's 24 is active at a time, the time required for an inactive CCPU 24 to infer the state of system 10 can be greatly reduced.

In use, each node electronic unit 20 receives state and sensor data from its respective breaker 16, and this data is then stored in node electronic unit 20, and is transmitted to CCPU 24 to perform computation and control functions. If at least one CCPU 24 experiences a loss of data or is reset, a redundant CCPU 24 can reconstruct the state of system 10 by obtaining a plurality of local information from each node electronic unit 20. Accordingly, each CCPU 24 can determine the state of system 10 without communicating directly with a second CCPU 24 thereby ensuring that each CCPU 24 is isolated from each other CCPU 24 and reducing a requirement for multiple controller synchronization.

Accordingly, a power distribution system 10 includes a redundant control system in which the actions of one CCPU 24 are inferred based on the state reported by each node electronic unit 20 since the state information for each circuit breaker 16 is locally available at its respective node electronic unit 20. Additionally, using redundant CCPU's, each node electronic unit 20 becomes the communication mechanism between the redundant CCPU's 24, thereby eliminating the need for any direct communication between CCPU's 24.

In use, redundant CCPU's 24 facilitate allowing each CCPU 24 to quickly reconstruct 306 system 10 information after a failure or loss of power to a CCPU 24, without having to maintain that information in each CCPU 24 non-volatile memory, thereby eliminating the need for non-volatile memory at each redundant CCPU 24 and ensuring that a power loss at one CCPU 24, does not leave system 10 in an unknown state.

Figure 8:
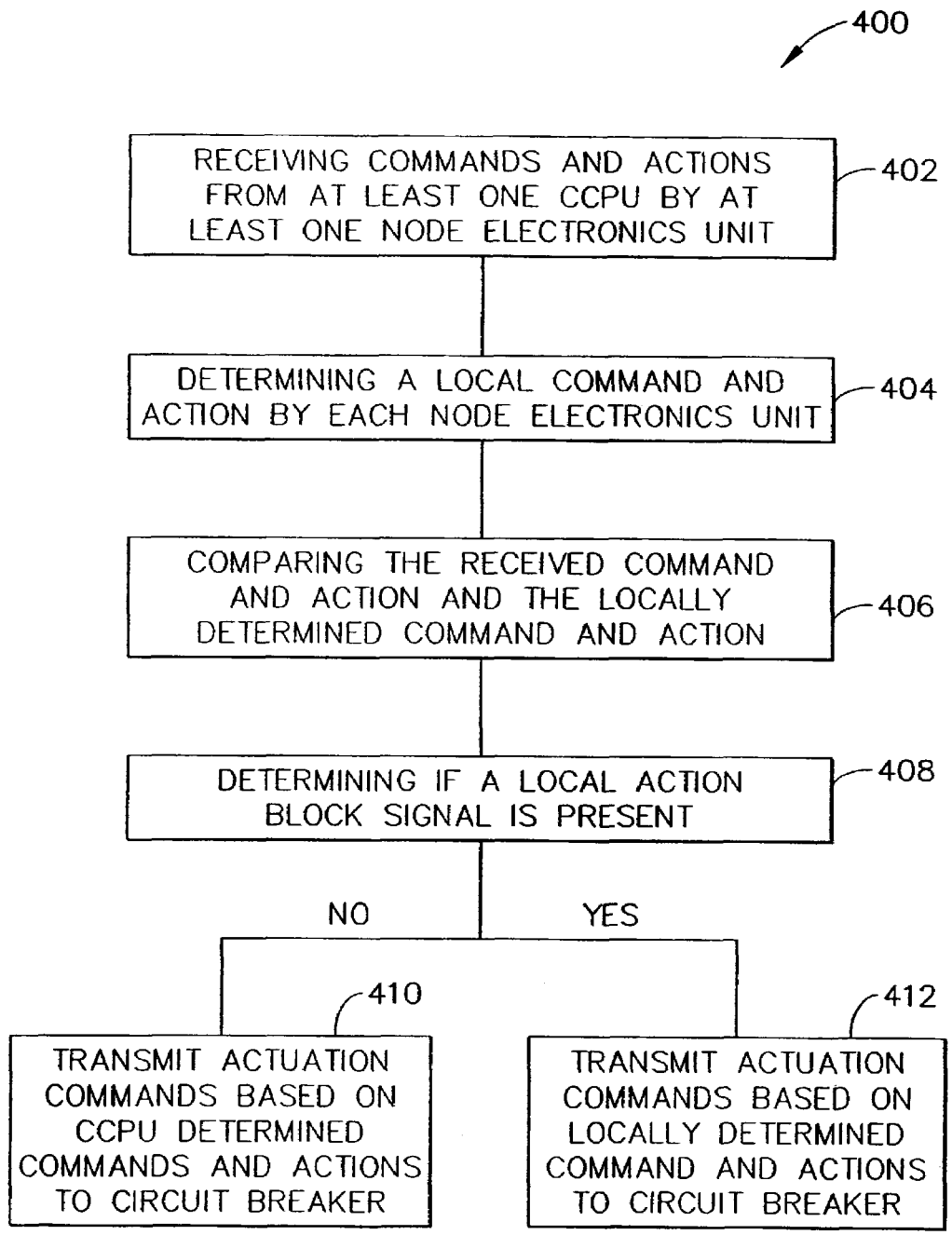
FIG. 8 is a flow chart illustrating an exemplary embodiment of a method 400 for operating power distribution system shown in FIG. 1.

FIG. 8 is a flow chart illustrating an exemplary embodiment of a method 400 for operating power distribution system 10 shown in FIG. 1. Method 400 includes receiving 402 CCPU commands and actions from at least one CCPU 24 by at least one node electronics unit 20. Each node electronics unit 20 also determines 404 a local commands and action. Each node electronics unit 20 includes a mirror of a subset of CCPU 24 program code and global information set. Each CCPU includes in its memory, program code and global information set relating to power distribution system 10 in its entirety. Each node electronics unit 20 includes in its memory only so much of power distribution system 10 information as is necessary to monitor conditions relating to its associated circuit breaker and relaying data to CCPU 24, and generating actuation commands for its associated circuit breaker. After node electronics unit 20 receives CCPU commands and actions from CCPU 24 and node electronics unit 20 determines a local commands and action, node electronics unit 20 compares 406 the CCPU commands and actions and local commands and actions. A difference between the CCPU commands and actions and local commands and actions may indicate a problem. In one embodiment, a difference between the CCPU commands and actions and local commands and actions is arbitrated by a command resolution module that uses an arbitration algorithm to determine which set of commands and actions is used to determine actuation commands that are sent from node electronics unit 20 to circuit breaker 16. In another embodiment, node electronics unit 20 determines 408 if CCPU 24 has sent a software local action block signal. A software local action block signal is a signal or bit(s) sent as part of a message from CCPU 24. A presence of the software local action block signal is indicative of proper communication between node electronics unit 20 and CCPU 24. The software local action block signal further indicates to node electronics unit 20 that CCPU commands and actions should be implemented rather than the local commands and actions. As such, when communications between node electronics 20 and CCPU 24 is lost, the software or virtual local action block signal will not be present. In such a case, node electronics unit 20 will transmit 412 actuation commands to circuit breaker 16 that are based on the locally determined commands and actions. If the virtual local action block signal is present, node electronics unit 20 transmits 410 actuation commands to circuit breaker 16 that are based on the CCPU commands and actions transmitted from CCPU 24.

In another exemplary embodiment, CCPU 24 includes a centralized control algorithm that includes a plurality of protection functions to control each respective node electronic unit 20 and each respective node electronic unit 20 includes a subset of the centralized algorithm stored in CCPU 24. In one embodiment, the algorithm stored in node electronic unit 20 is active. In another embodiment, the algorithm stored in node electronic unit 20 is inactive.

In use, when electronic unit 20 loses communications with CCPU 24, the algorithm stored electronic unit 20 is activated to maintain system 10 operation. Alternatively, when, if the local protection functions are currently active, the decisions from these functions may be compared against those from the centralized controller in a voting fashion. They may also be used as backup protection with their parameters set to a higher threshold such that the protection function will still be carried out if the centralized controller fails to perform that function. In one embodiment, and in the event that the central controller detects a failure mode that may allow it not to perform its control and protection functions correctly, the local node is instructed to activate its local protection algorithms. Thus an additional layer of redundancy and reliability is provided without sacrificing the flexibility of a centrally controlled system, and allows a subset of protection functions to be performed at the node electronics unit. Additionally, the node electronics unit, subject to the results (and availability of results) performs protective actions of the protection functions executed locally at the node electronics unit and remotely at CCPU 24.

In one embodiment, the local protection function parameters are set to the highest safe limit. In the case of a power distribution system, this may be the frame rating of a breaker. Typically, the centralized control algorithm will have its parameters set below the maximum breaker rating. In the event that CCPU 24 fails to protect the local device, the local device will then be capable of performing its own protection function. In another embodiment, the local device only activates its protection functions after it has detected a loss of communication with CCPU 24 or if the local control becomes inactive, the node electronics unit will respond to CCPU 24. In yet another embodiment, system 10 includes a redundant controller system in which the local node electronics unit itself acts as a tiebreaker between the redundant controllers.

The above-described power distribution systems are cost-effective and highly reliable. Each system includes a central control unit and networked devices to facilitate protecting a set of switchgear. Devices local to each circuit breaker monitor voltage and current signals from sensors located proximate each circuit breaker. The central control receives all monitored signals from all devices over the high-speed network. The central control implements protection and optimization algorithms for each breaker node based on global voltage and current signals. This method offers performance advantages over existing local, non-networked protection. In many overcurrent faults, the fault level may appear at multiple levels in the electrical protection hierarchy. Branch, feeder and main circuit breakers may all "see" the fault. Protection engineers can partially avoid the problem by setting longer delays. This results in faults at high levels in the hierarchy causing more damage and still can result in multiple devices interrupting, removing electrical service from circuits that do not have a fault. Accordingly, the power distribution system facilitates protection and optimization of power system operation in a cost-effective and reliable manner.

Exemplary embodiments of power distribution system components are described above in detail. The components are not limited to the specific embodiments described herein, but rather, components of each system may be utilized independently and separately from other components described herein. Each power distribution system component can also be used in combination with other power distribution system components.

While the invention has been described in terms of various specific embodiments, those skilled in the art will recognize that the invention can be practiced with modification within the spirit and scope of the claims.

What is claimed is:

1. A method for monitoring and controlling a power distribution system, said method comprising:

transmitting a first signal from at least one of a plurality of node electronic units to a central control unit, each of said plurality of node electronic units being remote from and in communication with a respective circuit breaker;

transmitting a second signal to the plurality of node electronic units such that the circuit breakers are operable from the central control unit;
determining a set of central control unit commands and actions based on said first signal;
determining a set of local protection commands and actions in each of said plurality of node electronic units; and
determining a difference between said set of central control unit commands and actions and said local command and action.

2. A method in accordance with claim 1 wherein said first signal is a digital signal representative of a parameter selected from the group consisting of: an operational state of each node electronic unit, an operational state of each circuit breaker, a power condition of power in the power distribution system, and any combination of the foregoing.

3. A method in accordance with claim 1 wherein said first signal is representative of at least one parameter selected from the group consisting of: a line voltage, a load current, and a status of the circuit breaker.

4. A method in accordance with claim 1 wherein the circuit breaker is a three phase circuit breaker.

5. A method in accordance with claim 1 wherein said first signal is a raw operational state data signal.

6. A method in accordance with claim 1 further comprising determining an operational state of the power distribution system based on said first signal.

7. A method in accordance with claim 1 wherein said set of central control unit commands and actions are at least one selected from the group consisting of: a protection function, a relay function, a monitor function, a meter function, a control function, and a protection curve function.

8. A method in accordance with claim 7 wherein said relay function is at least one selected from the group consisting of: a reverse power function, an under frequency function, an over voltage function, an under voltage function, an over current function, and differential relaying function.

9. A method in accordance with claim 7 wherein said protection function is at least one selected from the group consisting of: an instantaneous overcurrent action, a short time overcurrent action, a long time overcurrent action, a ground fault action, and a zone selective interlock action.

10. A method in accordance with claim 7 wherein said relay function is at least one selected from the group consisting of: a voltage action, a frequency action, a ground fault relay action, and a bus differential action.

11. A method in accordance with claim 7 said monitor function is at least one selected from the group consisting of: a circuit breaker current, a circuit breaker voltage, a power system event, a set of power quality parameters, and a health/availability indication.

12. A method in accordance with claim 11 wherein said power system event is at least one selected from the group consisting of: a load warning, a trip indication, a pickup, and a waveform capture.

13. A method in accordance with claim 8 wherein said meter function is at least one selected from the group consisting of: an energy flow and an energy demand.

14. A method in accordance with claim 8 wherein determining a control function comprises determining at least one of a basic function, and a system function.

15. A method in accordance with claim 14 wherein said basic function is at least one selected from the group consisting of: a manual function, a startup function, and a maintenance function.

16. A method in accordance with claim 14 wherein said system function is at least one selected from the group consisting of: an automatic throwover function, a balanced power supply function, a load shedding function, and a load pickup function.

17. A method in accordance with claim 8 wherein said protective curve function is a remote protective curve function and/or a local protective curve function.

18. A method in accordance with claim 17 wherein said remote protective curve comprises determining a plurality of first current limit setpoints, each of said first current limit setpoints corresponding to a first time delay value.

19. A method in accordance with claim 17 wherein determining a local protective curve comprises determining a plurality of second current limit setpoints, each of said second current limit setpoints corresponding to a second time delay value wherein each of said first current limit setpoints is greater than each of said second current limit setpoints.

20. A method in accordance with claim 1 wherein said second signal is at least one digital signal selected from the group consisting of: a system status signal, said set of central control unit command and action signals, and a local action block signal.

21. A method in accordance with claim 1 wherein said second signal is selected from the group consisting of: a ground fault current limit setting, an over voltage limit setting, under voltage limit setting, and a breaker local protective curve.

22. A method in accordance with claim 1 further comprising:
determining a set of actuation commands based on at least one of the actuation commands selected from the group consisting of: central control unit commands and actions, local protection commands and actions, and local action block signal; and
operating the associated circuit breaker based on the set of actuation commands.

23. A method in accordance with claim 1 wherein said second signal comprises a digital signal that includes data addressed to each of the plurality of node electronics units.

24. A method in accordance with claim 23 further comprising receiving said second signal at each node electronic unit and extracting all data addressed to the respective node electronic unit from said second signal.

25. A method for monitoring and controlling a power distribution system, said method comprising:
transmitting a first signal from each of a plurality of node electronic units to a central control unit, each of said plurality of node electronic units being remote from and in communication with a respective circuit breaker, said first signal comprising raw current and voltage data received from said respective circuit breaker;
controlling said central control unit to determine a set of central control unit commands and actions based on said first signal from all of said plurality of node electronic units;
transmitting said set of central control unit commands and actions to said plurality of node electronic units;
controlling each of said plurality of node electronic units to determine a local protection command and action for that particular node electronic unit; and
running an arbitration algorithm in each of said plurality of node electronic units to determine whether to control said respective circuit breaker based on said set of central control unit commands and actions or said local protection command and action.

26. A method in accordance with claim 25 wherein said set of central control unit commands and actions comprise at least one function selected from the group consisting of: an instantaneous overcurrent action, a short time overcurrent action, a long time overcurrent action, a ground fault action, and a zone selective interlock action.

* * * * *